United States Patent
Takeshita et al.

(10) Patent No.: US 7,803,435 B2
(45) Date of Patent: Sep. 28, 2010

(54) LIQUID CRYSTAL COMPOSITION AND LIQUID CRYSTAL DISPLAY APPARATUS HAVING THE SAME

(75) Inventors: Fusayuki Takeshita, Seoul (KR); Jong-Ho Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 12/107,262

(22) Filed: Apr. 22, 2008

(65) Prior Publication Data

US 2008/0268181 A1  Oct. 30, 2008

(30) Foreign Application Priority Data

Apr. 24, 2007  (KR) .................. 10-2007-0039891

(51) Int. Cl.
  *C09K 19/32* (2006.01)
  *C09K 19/34* (2006.01)
  *C09K 19/30* (2006.01)
  *C09K 19/12* (2006.01)

(52) U.S. Cl. .............. 428/1.1; 252/299.61; 252/299.62; 252/299.63; 252/299.66

(58) Field of Classification Search ............ 252/299.61, 252/299.66, 266.63, 299.62; 428/1.1
See application file for complete search history.

(56) References Cited

U.S. PATENT DOCUMENTS

| 7,226,644 | B2 * | 6/2007 | Matsumoto et al. | 428/1.3 |
| 7,618,689 | B2 * | 11/2009 | Son et al. | 428/1.1 |
| 2003/0210366 | A1 * | 11/2003 | Huang et al. | 349/113 |
| 2005/0168676 | A1 * | 8/2005 | Kishida et al. | 349/124 |
| 2005/0190326 | A1 * | 9/2005 | Jeon et al. | 349/117 |
| 2006/0256275 | A1 * | 11/2006 | Shin et al. | 349/167 |
| 2007/0272897 | A1 * | 11/2007 | Son et al. | 252/299.61 |
| 2008/0138542 | A1 * | 6/2008 | Son et al. | 428/1.3 |

FOREIGN PATENT DOCUMENTS

| JP | 2005272562 | 10/2005 |
| JP | 2006069914 | 3/2006 |
| JP | 2006124544 | 5/2006 |

* cited by examiner

*Primary Examiner*—Shean C Wu
(74) *Attorney, Agent, or Firm*—H.C. Park & Associates, PLC

(57) ABSTRACT

A liquid crystal composition includes about 1 to about 40% by weight of an alkoxyl naphthalene-base compound, about 5 to about 30% by weight of a dialkoxyl naphthalene-base compound, and about 5 to about 80% by weight of a low viscosity compound.

6 Claims, 1 Drawing Sheet

LIQUID CRYSTAL COMPOSITION AND LIQUID CRYSTAL DISPLAY APPARATUS HAVING THE SAME

CROSS-REFERENCE TO RELATED APPLICATIONS

This application claims priority from and the benefit of Korean Patent Application No. 10-2007-0039891, filed on Apr. 24, 2007, which is hereby incorporated by reference for all purposes as if fully set forth herein.

BACKGROUND OF THE INVENTION

1. Field of the Invention

The present invention relates to a liquid crystal composition and a liquid crystal display (LCD) apparatus including the liquid crystal composition. More particularly, the present invention relates to a liquid crystal composition used for an LCD apparatus and an LCD apparatus including the liquid crystal composition, which has improved image display quality.

2. Discussion of the Background

A liquid crystal display (LCD) apparatus displays an image using the optical and electrical properties of liquid crystal molecules, such as the anisotropic refractive index and the anisotropic dielectric constant. An LCD apparatus has lighter weight, lower power consumption, lower driving voltage, etc., as compared to other types of display apparatuses, such as a cathode ray tube (CRT) and a plasma display panel (PDP).

Generally, an LCD apparatus includes an LCD panel and a light source to provide the LCD panel with light. The LCD panel includes a thin-film transistor (TFT) substrate, a color filter substrate, and a liquid crystal layer interposed between the TFT substrate and the color filter substrate. Light generated by the light source passes through the liquid crystal layer, and the liquid crystal layer controls the transmittance of the light to display an image.

However, LCD apparatuses often have afterimages. For example, when an LCD apparatus in vertical alignment (VA) mode is operated for a long time, a threshold voltage in an area adjacent to an edge of a pixel area may be varied so that the display quality is deteriorated. This may be due to ionic impurities from an organic insulation layer.

Furthermore, the transition temperature of a conventional liquid crystal composition is about 70° C. Thus, when the liquid crystal composition is heated by a lamp of the light source, a transition in the phase of the liquid crystal composition in a portion of a display area may occur. Thus, display quality may be deteriorated.

SUMMARY OF THE INVENTION

The present invention provides a liquid crystal composition that may have improved reliability and afterimage characteristics.

The present invention also provides an LCD apparatus having the above-mentioned liquid crystal composition.

Additional features of the invention will be set forth in the description which follows, and in part will be apparent from the description, or may be learned by practice of the invention.

The present invention discloses a liquid crystal composition including about 1 to about 40% by weight of an alkoxyl naphthalene-base compound, about 5 to about 30% by weight of a dialkoxyl naphthalene-base compound, and about 5 to about 80% by weight of a low viscosity compound.

The alkoxyl naphthalene-base compound includes a compound represented by Chemical Formula 1 or Chemical Formula 2

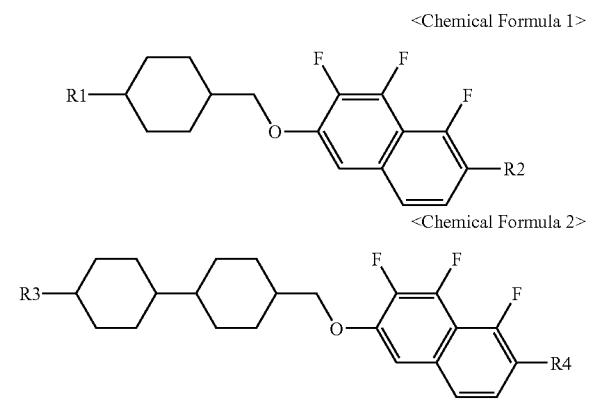

wherein R1, R2, R3, and R4 independently represent an alkyl group having 1 to 10 carbon atoms.

The dialkoxyl naphthalene-base compound includes a compound represented by Chemical Formula 3, Chemical Formula 4, or Chemical Formula 5

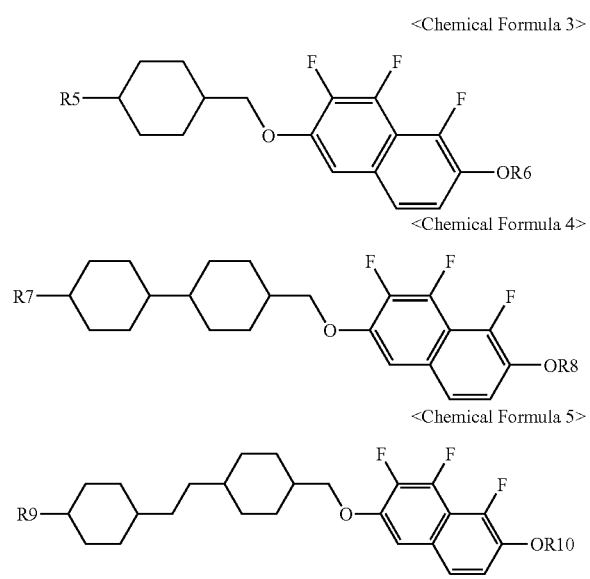

wherein R5, R6, R7, R8, R9, and R10 independently represent an alkyl group having 1 to 10 carbon atoms.

The low viscosity compound may include a compound represented by Chemical Formula 8, Chemical Formula 9, Chemical Formula 10, Chemical Formula 11, Chemical Formula 12, or Chemical Formula 13

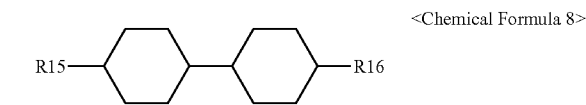

-continued

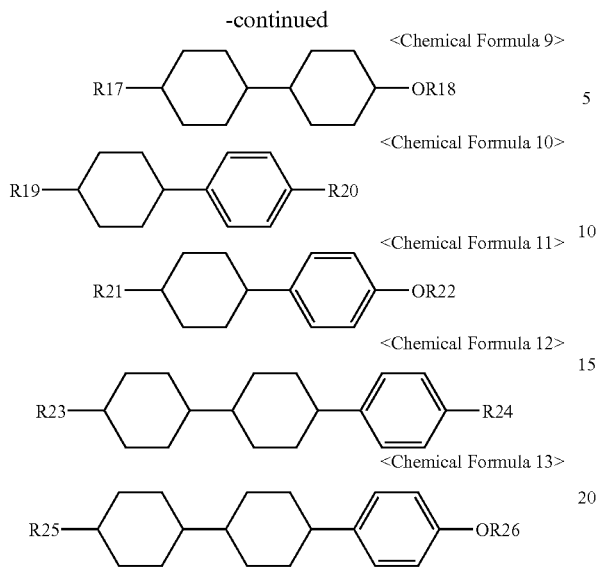

wherein R15, R16, R17, R18, R9, R20, R21, R22, R23, R24, R25, and R26 independently represent an alkyl group having 1 to 10 carbon atoms.

The present invention also discloses an LCD apparatus including a thin-film transistor (TFT) substrate, an opposing substrate, and a liquid crystal layer interposed between the TFT substrate and the opposing substrate. The TFT substrate includes a plurality of TFTs. The opposing substrate faces the TFT substrate. The liquid crystal layer includes a liquid crystal composition that includes about 1 to about 40% by weight of an alkoxyl naphthalene-base compound, about 5 to about 30% by weight of a dialkoxyl naphthalene-base compound, and about 5 to about 80% by weight of a low viscosity compound.

The alkoxyl naphthalene-base compound includes a compound represented by Chemical Formula 1 or Chemical Formula 2

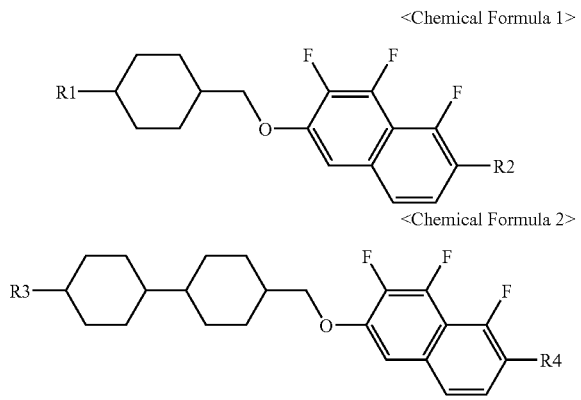

wherein R1, R2, R3, and R4 independently represent an alkyl group having 1 to 10 carbon atoms.

The dialkoxyl naphthalene-base compound includes a compound represented by Chemical Formula 3, Chemical Formula 4, or Chemical Formula 5

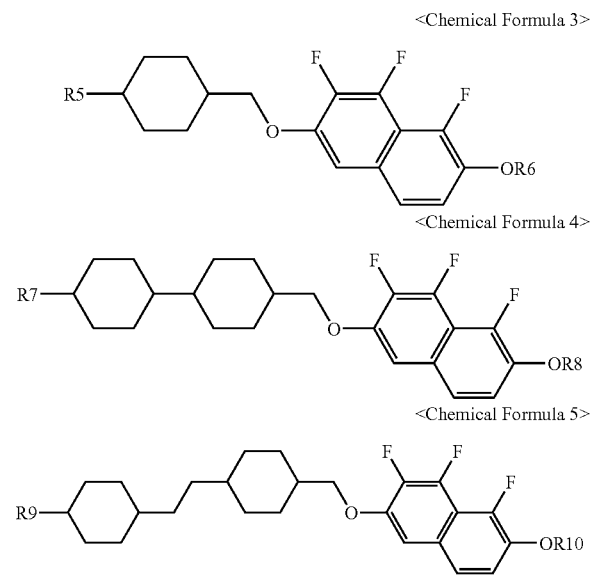

wherein R5, R6, R7, R8, R9, and R10 independently represent an alkyl group having 1 to 10 carbon atoms.

The low viscosity compound may include a compound represented by Chemical Formula 8, Chemical Formula 9, Chemical Formula 10, Chemical Formula 11, Chemical Formula 12, or Chemical Formula 13

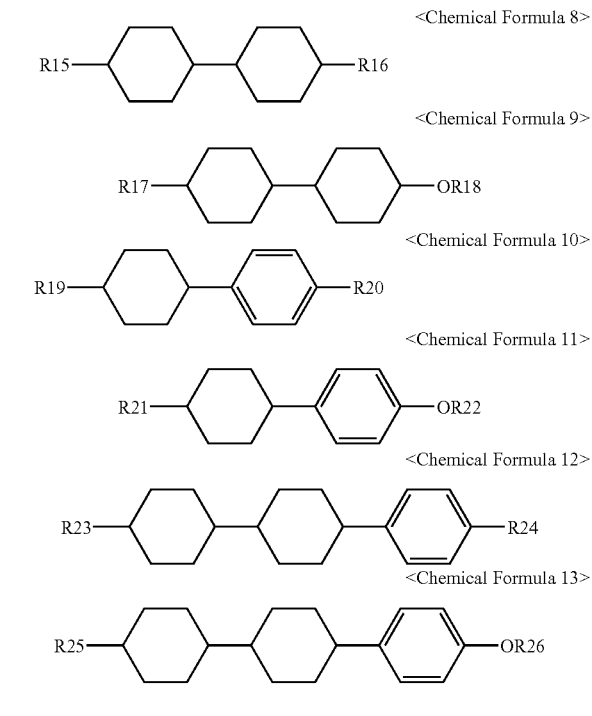

wherein R15, R16, R17, R18, R19, R20, R21, R22, R23, R24, R25, and R26 independently represent an alkyl group having 1 to 10 carbon atoms.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
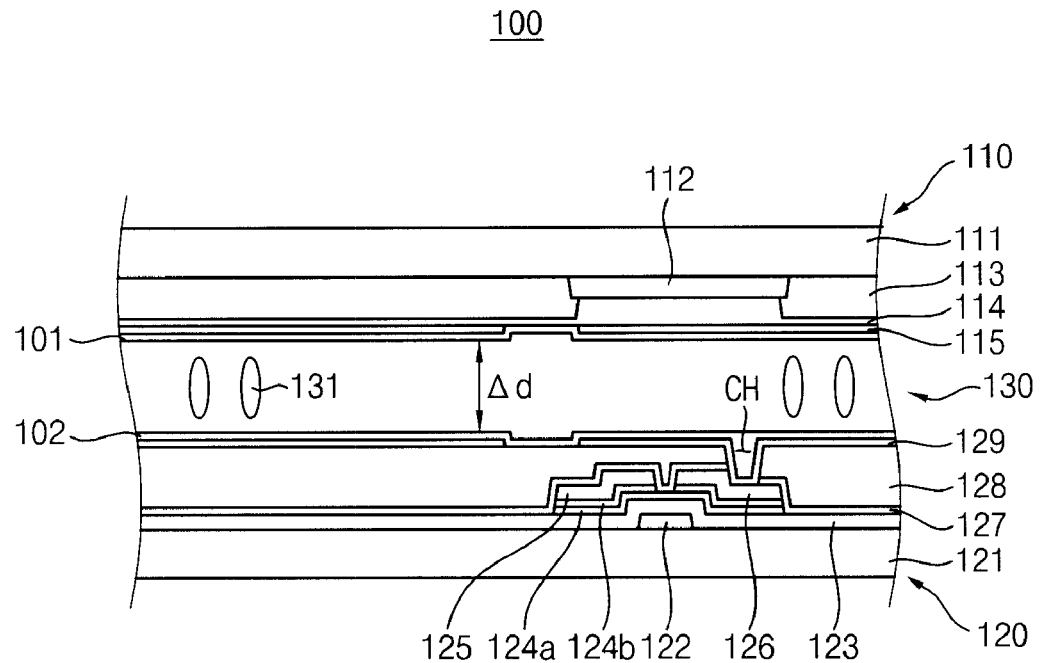
FIG. 1 is a cross-sectional view showing a liquid crystal display (LCD) apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to," or "coupled to" another element or layer, it can be directly on, connected, or coupled to the other element or layer or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Liquid Crystal Composition

A liquid crystal composition according to an exemplary embodiment of the present invention includes about 1 to about 40% by weight of an alkoxyl naphthalene-base compound, about 5 to about 30% by weight of a dialkoxyl naphthalene-base compound, about 0 to about 40% by weight of a chromene-based compound, and about 5 to about 80% by weight of a low viscosity compound.

The alkoxyl naphthalene-base compound may include a compound represented by Chemical Formula 1 or Chemical Formula 2

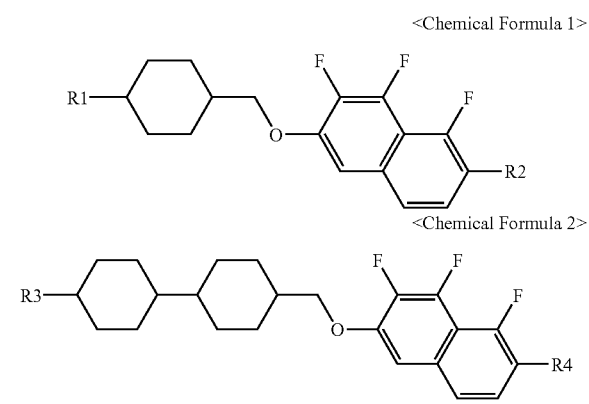

wherein R1, R2, R3, and R4 independently represent an alkyl group having 1 to 10 carbon atoms.

The dialkoxyl naphthalene-base compound may include a compound represented by Chemical Formula 3, Chemical Formula 4, or Chemical Formula 5

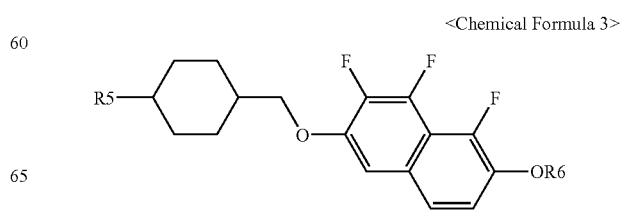

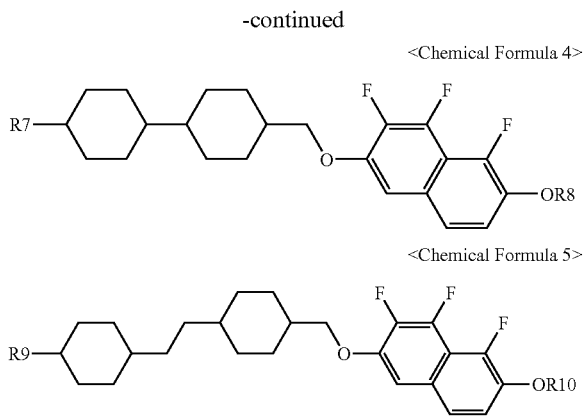

wherein R5, R6, R7, R8, R9, and R10 independently represent an alkyl group having 1 to 10 carbon atoms.

The chromene-based compound may include a compound represented by Chemical Formula 6 or Chemical Formula 7

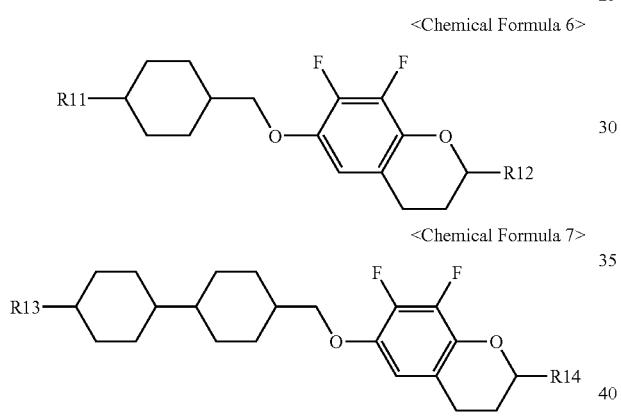

wherein R11, R12, R13, and R14 independently represent an alkyl group having 1 to 10 carbon atoms.

The low viscosity compound may include a compound represented by Chemical Formula 8, Chemical Formula 9, Chemical Formula 10, Chemical Formula 11, Chemical Formula 12, or Chemical Formula 13

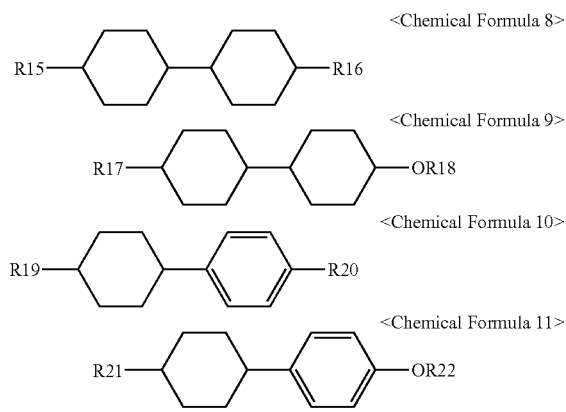

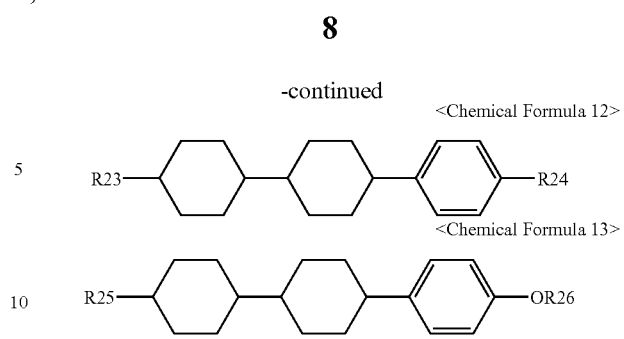

wherein R15, R16, R17, R18, R19, R20, R21, R22, R23, R24, R25, and R26 independently represent an alkyl group having 1 to 10 carbon atoms.

The liquid crystal composition may further include a fifth compound. The fifth compound may include a compound represented by Chemical Formula 14, Chemical Formula 15, or Chemical Formula 16.

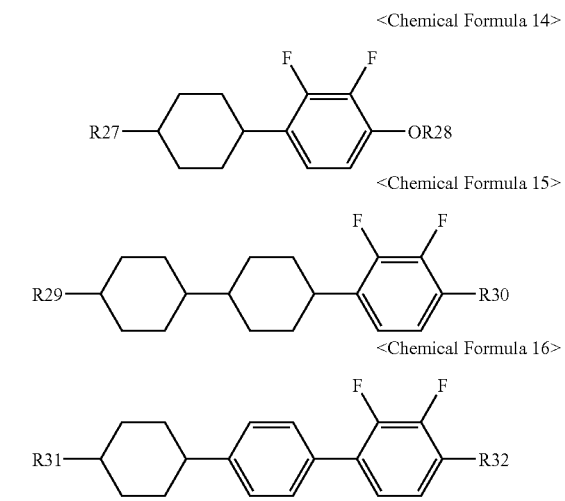

wherein R27, R28, R29, and R31 independently represent an alkyl group having 1 to 10 carbon atoms, and R30 and R32 independently represent an alkyl group having 1 to 10 carbon atoms or an alkoxyl group having 1 to 10 carbon atoms.

The Δn value of the alkoxyl naphthalene-base compound, which represents a diffraction anisotropy, is relatively high, and the Δ∈ value of the alkoxyl naphthalene-base compound, which represents a dielectric anisotropy, are negative. The absolute Δ∈ value of the alkoxyl naphthalene-base compound is less than that of the dialkoxyl naphthalene-base compound. However, the alkoxyl naphthalene-base compound may have relatively high reliability and may prevent the occurrence of afterimages. The content of the alkoxyl naphthalene-base compound may be about 1 to about 40% by weight based on the total weight of the liquid crystal composition. When the content of the alkoxyl naphthalene-base compound is more than 40%, the viscosity of the liquid crystal composition may increase such that the response speed is reduced.

The Δ∈ value of the dialkoxyl naphthalene-base compound is negative, and the viscosity of the dialkoxyl naphthalene-base compound is relatively low. However, the dialkoxyl naphthalene-base compound may have relatively low reliability. The liquid crystal composition may include about 5 to about 30% of the dialkoxyl naphthalene-base compound.

When the content of the dialkoxyl naphthalene-base compound is more than 30%, the frequency of afterimages on an LCD screen apparatus may increase. When the content of the dialkoxyl naphthalene-base compound is less than 5%, the viscosity of the liquid crystal composition may increase such that the response speed is reduced. The reliability difference between the alkoxyl naphthalene-base compound and dialkoxyl naphthalene-base compound may be due to an alkoxyl group combined with the naphthalene ring of the dialkoxyl naphthalene-base compound.

The $\Delta\in$ value of the chromene-based compound is negative. The content of the chromene-based compound may be about 40% by weight or less. When the content of the chromene-based compound is more than 40%, the frequency of afterimages on an LCD screen apparatus may increase. The chromene-based compound may be omitted from the liquid crystal composition.

The $\Delta\in$ value of the low viscosity compound may be close to 0. The low viscosity compound may serve to reduce the viscosity of the liquid crystal composition in order to increase the response speed of the liquid crystal composition and may serve to control the transition temperature of the liquid crystal composition. The liquid crystal composition may include about 5 to about 80% by weight of the low viscosity compound. When the content of the low viscosity compound is less than 5%, the viscosity of the liquid crystal composition may be increased such that the response speed is reduced. When the content of the low viscosity compound is more than 80%, the threshold voltage may be increased.

Particularly, when the liquid crystal composition includes the compound of Chemical Formula 8 or the compound of Chemical Formula 9, the content of the compound of Chemical Formula 8 or the content of the compound of Chemical Formula 9 should be no more than 50% by weight because the compound of Chemical Formula 8 or the compound of Chemical Formula 9 may form a smectic phase or a crystal at a low temperature.

When the liquid crystal composition includes the compound of Chemical Formula 10, the content of the compound of Chemical Formula 10 should be no more than 50% by weight because the transition temperature of the compound of Chemical Formula 10 is relatively low.

When the liquid crystal composition includes the compound of Chemical Formula 11, the content of the compound of Chemical Formula 11 should be no more than 60% by weight because the transition temperature of the compound of Chemical Formula 11 is relatively low, but higher than that of the compound of Chemical Formula 10.

The transition temperature of the compound of Chemical Formula 12 is usually higher than about 100° C. When the liquid crystal composition includes the compound of Chemical Formula 12, the content of the compound of Chemical Formula 12 should be no more than 40% by weight. When the content of the compound of Chemical Formula 12 is more than 40% by weight, the viscosity of the liquid crystal composition is increased to form a smectic phase or a crystal at a low temperature.

The $\Delta n$ value of the liquid crystal composition may be about 0.08 to about 0.25. Furthermore, the $\Delta\in$ value of the liquid crystal composition may be negative.

None of the alkoxyl naphthalene-base compound, the dialkoxyl naphthalene-base compound, the chromene-based compound, and the low viscosity compound may contain an alkenyl group or a carboxyl group. An alkenyl group or a carboxyl group may deteriorate the stability of the liquid crystal composition.

Hereinafter, the liquid crystal composition will be further described through Examples and Comparative Examples.

Example 1

About 4% by weight of a compound represented by Chemical Formula 1A, about 4% by weight of a compound represented by Chemical Formula 1B, about 3% by weight of a compound represented by Chemical Formula 3A, about 2% by weight of a compound represented by Chemical Formula 3B, about 3% by weight of a compound represented by Chemical Formula 3C, about 4% by weight of a compound represented by Chemical Formula 4A, about 4% by weight of a compound represented by Chemical Formula 4B, about 4% by weight of a compound represented by Chemical Formula 5A, about 4% by weight of a compound represented by Chemical Formula 5B, about 4% by weight of a compound represented by Chemical Formula 7A, about 15% by weight of a compound represented by Chemical Formula 8A, about 7% by weight of a compound represented by Chemical Formula 8B, about 5% by weight of a compound represented by Chemical Formula 8C, about 14% by weight of a compound represented by Chemical Formula 11A, about 14% by weight of a compound represented by Chemical Formula 11B, and about 9% by weight of a compound represented by Chemical Formula 12A were mixed to prepare a liquid crystal composition.

<Chemical Formula 1A>

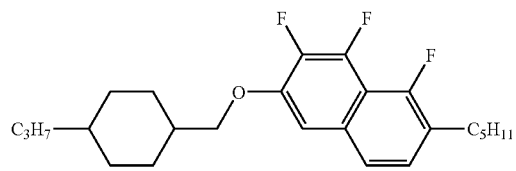

<Chemical Formula 1B>

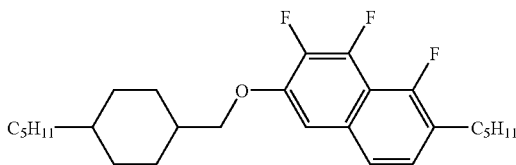

<Chemical Formula 3A>

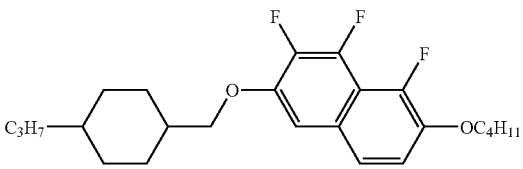

<Chemical Formula 3B>

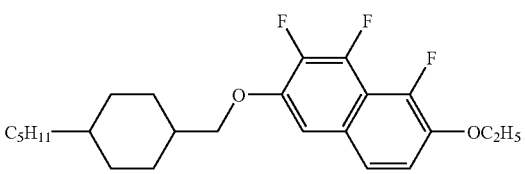

-continued

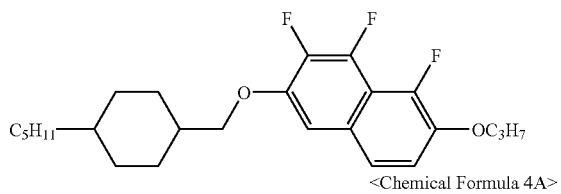
<Chemical Formula 3C>

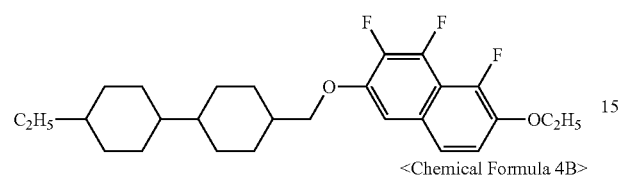
<Chemical Formula 4A>

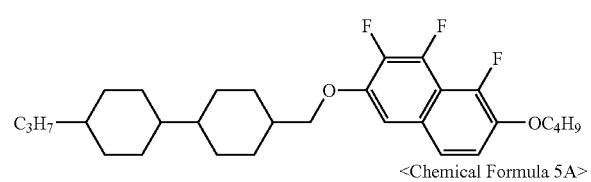
<Chemical Formula 4B>

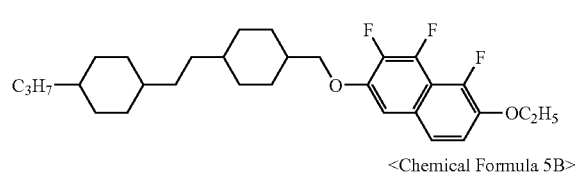
<Chemical Formula 5A>

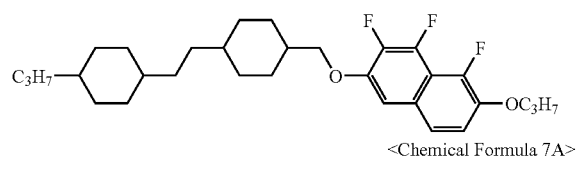
<Chemical Formula 5B>

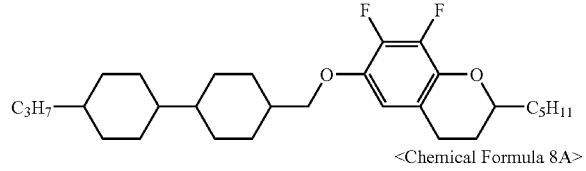
<Chemical Formula 7A>

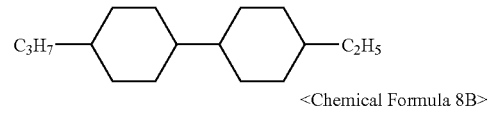
<Chemical Formula 8A>

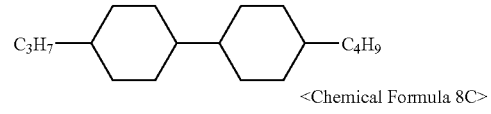
<Chemical Formula 8B>

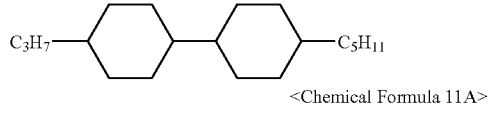
<Chemical Formula 8C>

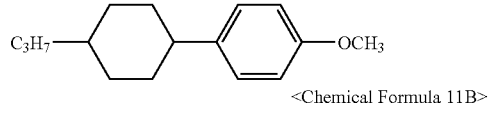
<Chemical Formula 11A>

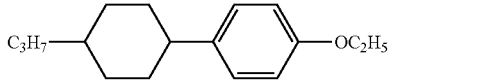
<Chemical Formula 11B>

-continued

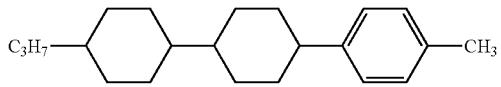
<Chemical Formula 12A>

The transition temperature of the liquid crystal composition was about 80° C. The Δn value of the liquid crystal composition was about 0.069. The Δ∈ value of the liquid crystal composition was about −3.2.

Comparative Example 1

DSV-4009® (manufactured by Dainippon Ink in Japan) was prepared as Comparative Example 1, DSV-4009® including about 8% by weight of a compound represented by Chemical Formula 17, about 8% by weight of a compound represented by Chemical Formula 18, about 8% by weight of a compound represented by Chemical Formula 19, about 8% by weight of a compound represented by Chemical Formula 20, about 6% by weight of a compound represented by Chemical Formula 21, about 15% by weight of a compound represented by Chemical Formula 22, about 41% by weight of a compound represented by Chemical Formula 23, and about 6% by weight of a compound represented by Chemical Formula 24.

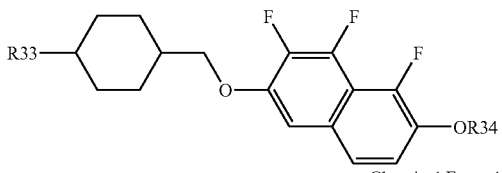
<Chemical Formula 17>

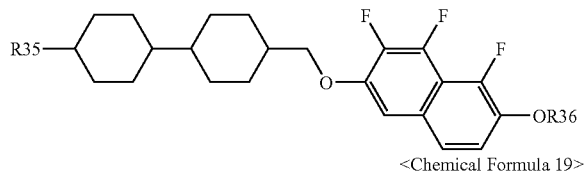
<Chemical Formula 18>

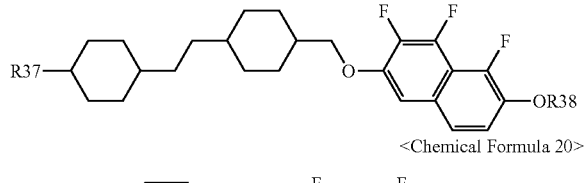
<Chemical Formula 19>

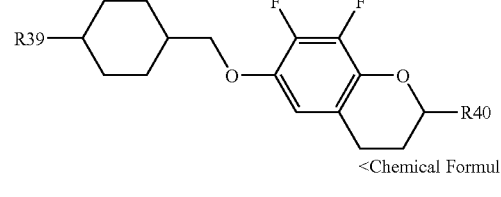
<Chemical Formula 20>

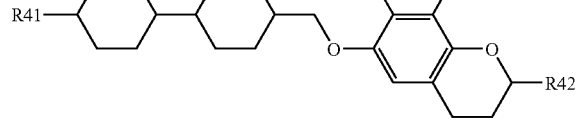
<Chemical Formula 21>

-continued

<Chemical Formula 22>

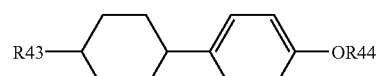

<Chemical Formula 23>

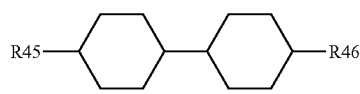

<Chemical Formula 24>

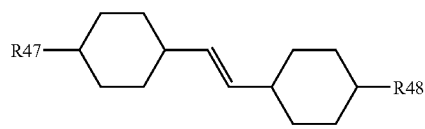

wherein R33, R34, R35, R36, R37, R38, R39, R40, R41, R42, R43, R44, R46, R47, and R48 independently represent an alkyl group, and R45 represents an alkenyl group.

The transition temperature of the liquid crystal composition was about 80° C. The Δn value of the liquid crystal composition was about 0.082. The Δ∈ value of the liquid crystal composition was about −3.7.

Experiment 1—Evaluation of Afterimage Characteristics

Two 17-inch LCD panels (for monitors) including the liquid crystal compositions of Example 1 and Comparative Example 1, respectively, and two 32-inch LCD panels (for televisions) including the liquid crystal compositions of Example 1 and Comparative Example 1, respectively, were prepared. The cell gap of each LCD panel was about 3.75 μm. The LCD panels displayed a predetermined pattern image to observe afterimages, and the results obtained are shown below in Table 1.

Particularly, each LCD panel was a patterned vertical alignment (PVA) mode panel having pixels divided into four domains. The 17-inch panels included AL659® (manufactured by JSR in Japan), a polyimide-based vertical alignment film, and the 32-inch panels included AL60702® (manufactured by JSR in Japan).

TABLE 1

| | | Appearance Time of Afterimages (h) | Response Speed (ms, at 25° C.) |
|---|---|---|---|
| 17-inch panel (at 70° C.) | Example 1 | More than 1,000 | — |
| | Comparative Example 1 | 128 | — |
| 32-inch panel (at 50° C.) | Example 1 | More than 3,000 | 21 |
| | Comparative Example 1 | 350 | 22 |

Referring to Table 1, afterimages were observed on the 17-inch panel including the liquid crystal composition of Comparative Example 1 after the 17-inch panel had been driven for about 128 hours at about 70° C. Furthermore, afterimages were observed on the 32-inch panel including the liquid crystal composition of Comparative Example 1 after the 32-inch panel had been driven for about 350 hours at about 50° C. In contrast, afterimages were not observed on the 17-inch panel including the liquid crystal composition of Example 1 after the 17-inch panel had been driven for more than about 1,000 hours at about 70° C. Furthermore, afterimages were not observed on the 32-inch panel including the liquid crystal composition of Example 1 after the 32-inch panel had been driven for more than about 3,000 hours at about 50° C. Moreover, the response speed of the 32-inch panel including the liquid crystal composition of Example 1 was higher than that of the 32-inch panel including the liquid crystal composition of Comparative Example 1.

Thus, it can be noted that the reliability of the liquid crystal composition of Example 1 is better than that of the liquid crystal composition of Comparative Example 1.

Example 2

About 6% by weight of a compound represented by Chemical Formula 1A, about 6% by weight of a compound represented by Chemical Formula 1B, about 4% by weight of a compound represented by Chemical Formula 2A, about 4% by weight of a compound represented by Chemical Formula 4A, about 4% by weight of a compound represented by Chemical Formula 4B, about 4% by weight of a compound represented by Chemical Formula 5A, about 4% by weight of a compound represented by Chemical Formula 5B, about 4% by weight of a compound represented by Chemical Formula 7A, about 15% by weight of a compound represented by Chemical Formula 8A, about 7% by weight of a compound represented by Chemical Formula 8B, about 5% by weight of a compound represented by Chemical Formula 8C, about 14% by weight of a compound represented by Chemical Formula 11A, about 14% by weight of a compound represented by Chemical Formula 11B, and about 9% by weight of a compound represented by Chemical Formula 12A were mixed to prepare a liquid crystal composition.

<Chemical Formula 1A>

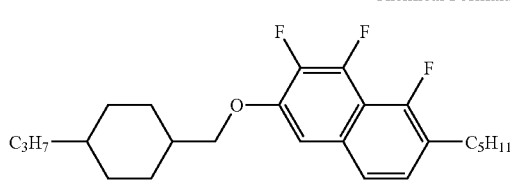

<Chemical Formula 1B>

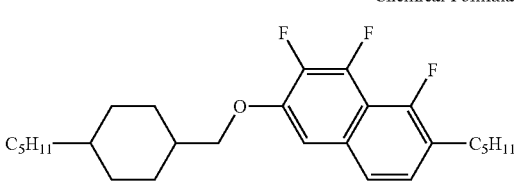

<Chemical Formula 2A>

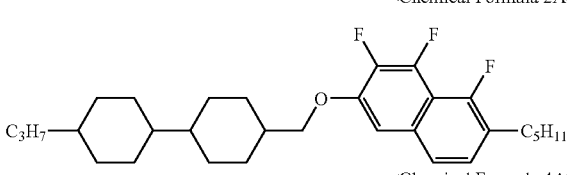

<Chemical Formula 4A>

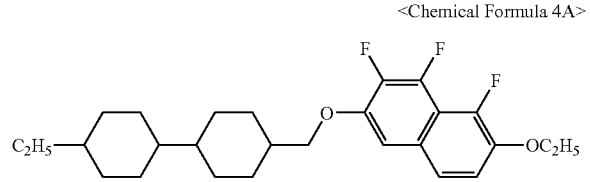

-continued

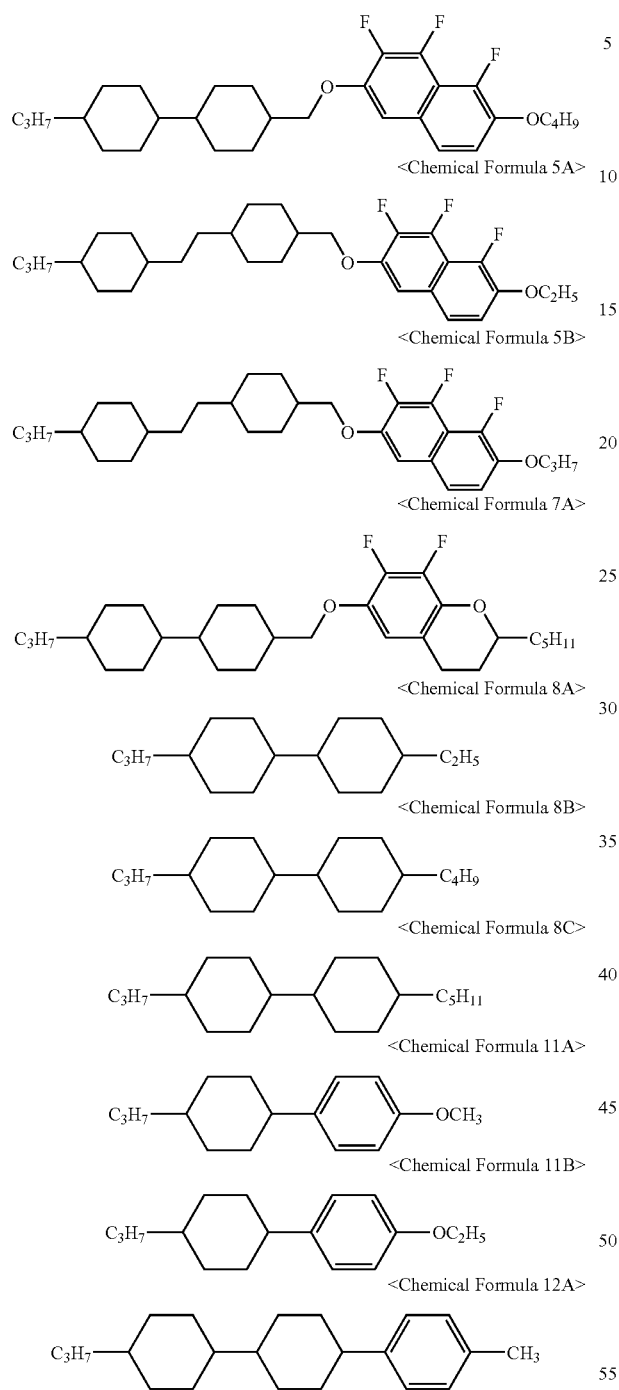

The transition temperature of the liquid crystal composition was about 81° C. The Δn value of the liquid crystal composition was about 0.089. The Δ∈ value of the liquid crystal composition was about −3.5.

Comparative Example 2

MJ961213® (manufactured by Merck in Germany) was prepared as Comparative Example 2, MJ961213® including a compound represented by Chemical Formula 25, and a compound represented by the following Chemical Formula 26.

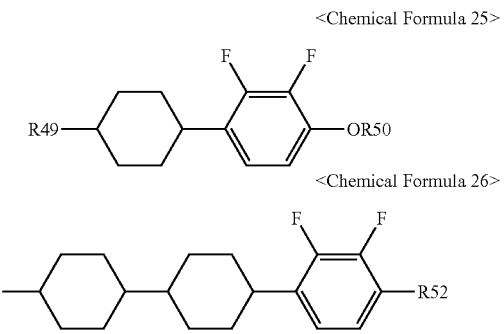

wherein R49, R50, and R51 independently represent an alkyl group, and R52 represents an alkyl group or an alkoxyl group.

The transition temperature of the liquid crystal composition was about 70° C. The Δn value of the liquid crystal composition was about 0.082. The Δ∈ value of the liquid crystal composition was about −3.8.

Since the transition temperature of the liquid crystal composition of Example 2 is higher than that of Comparative Example 2, it is noted that the heat resistance of the liquid crystal composition of Example 2 is greater than that of Comparative Example 2. Furthermore, the absolute Δ∈ values of the compounds of Chemical Formulas 1, 2, 4, 5, and 7 are greater than those of the compounds of Chemical Formulas 25 and 26. Thus, the liquid crystal composition of the exemplary embodiment of the present invention may have a desired dielectric anisotropy because it includes less of a negative dielectric anisotropy compound that requires relatively high manufacturing costs, than the liquid crystal composition of Comparative Example 2. Therefore, the cost of manufacturing a liquid crystal composition may be reduced.

Example 3

About 6% by weight of a compound represented by Chemical Formula 1A, about 6% by weight of a compound represented by Chemical Formula 1B, about 4% by weight of a compound represented by Chemical Formula 2A, about 4% by weight of a compound represented by Chemical Formula 4A, about 4% by weight of a compound represented by Chemical Formula 4B, about 4% by weight of a compound represented by Chemical Formula 5A, about 4% by weight of a compound represented by Chemical Formula 5B, about 3% by weight of a compound represented by Chemical Formula 7B, about 15% by weight of a compound represented by Chemical Formula 8A, about 7% by weight of a compound represented by Chemical Formula 8B, about 14% by weight of a compound represented by Chemical Formula 11A, about 14% by weight of a compound represented by Chemical Formula 11B, about 9% by weight of a compound represented by Chemical Formula 12A, and about 6% by weight of a compound represented by Chemical Formula 15A were mixed to prepare a liquid crystal composition.

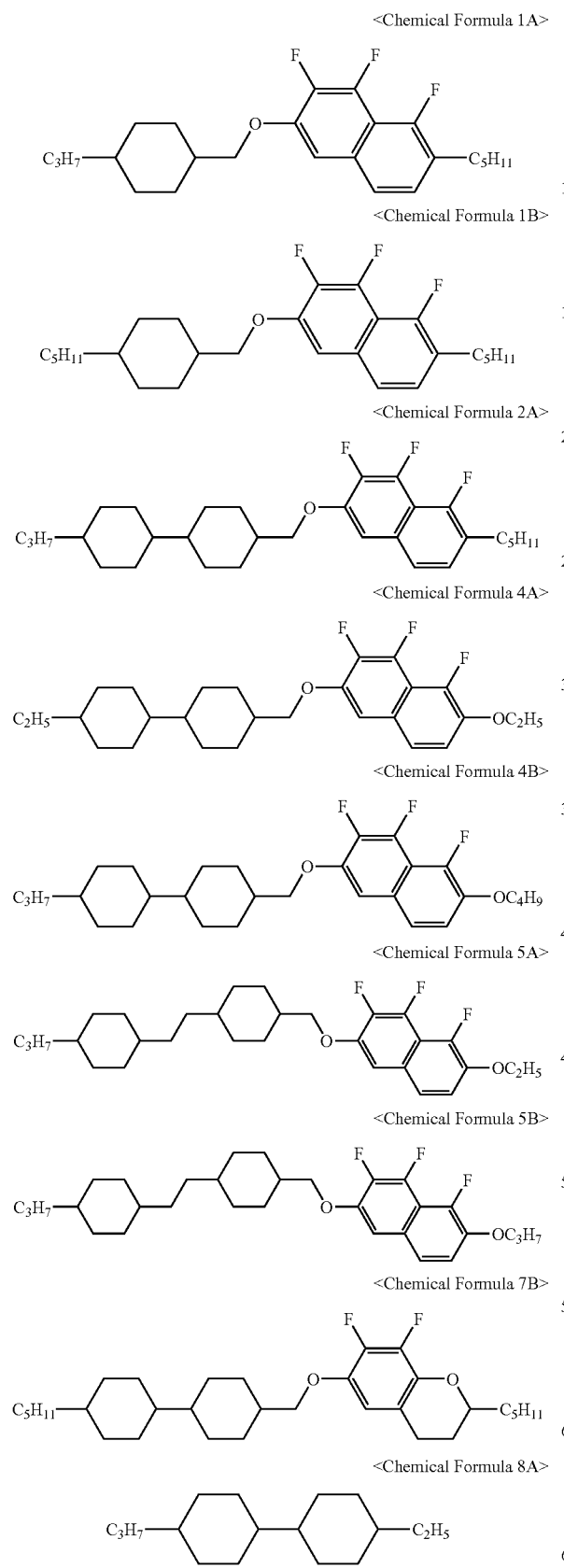

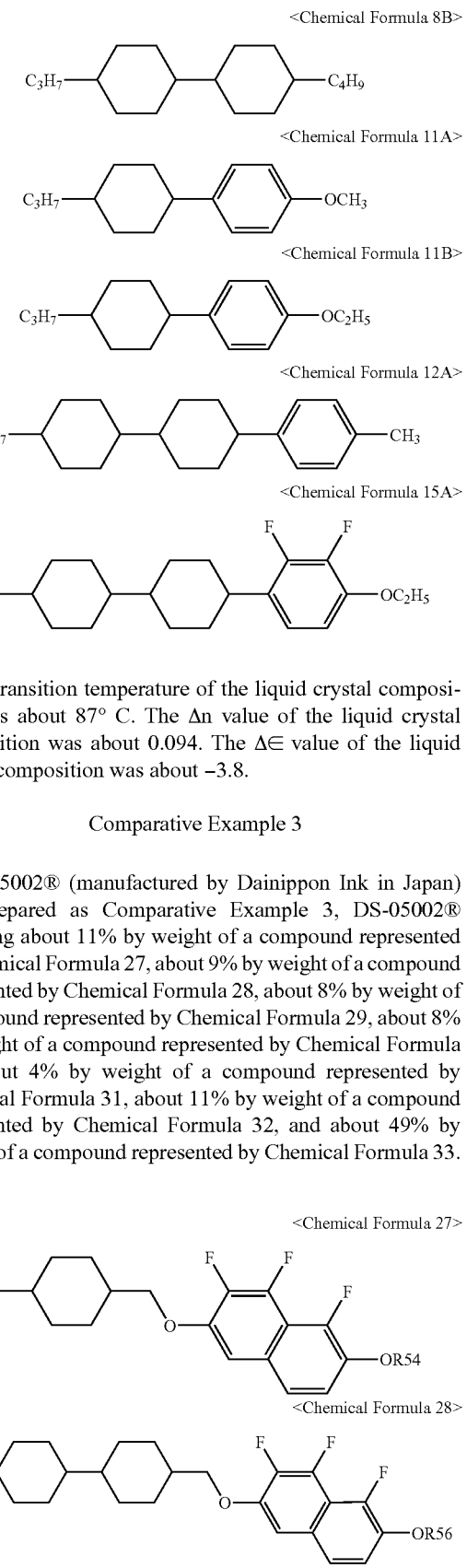

The transition temperature of the liquid crystal composition was about 87° C. The Δn value of the liquid crystal composition was about 0.094. The Δ∈ value of the liquid crystal composition was about −3.8.

Comparative Example 3

DS-05002® (manufactured by Dainippon Ink in Japan) was prepared as Comparative Example 3, DS-05002® including about 11% by weight of a compound represented by Chemical Formula 27, about 9% by weight of a compound represented by Chemical Formula 28, about 8% by weight of a compound represented by Chemical Formula 29, about 8% by weight of a compound represented by Chemical Formula 30, about 4% by weight of a compound represented by Chemical Formula 31, about 11% by weight of a compound represented by Chemical Formula 32, and about 49% by weight of a compound represented by Chemical Formula 33.

-continued

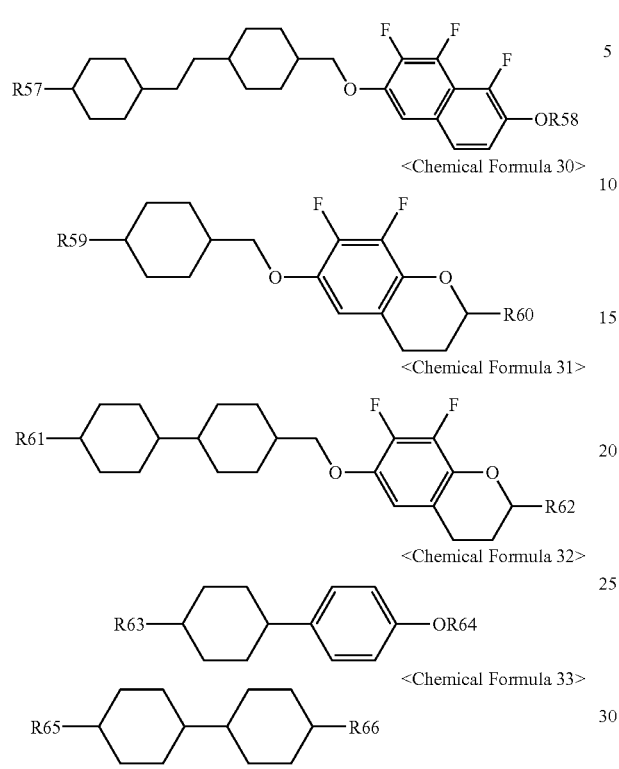

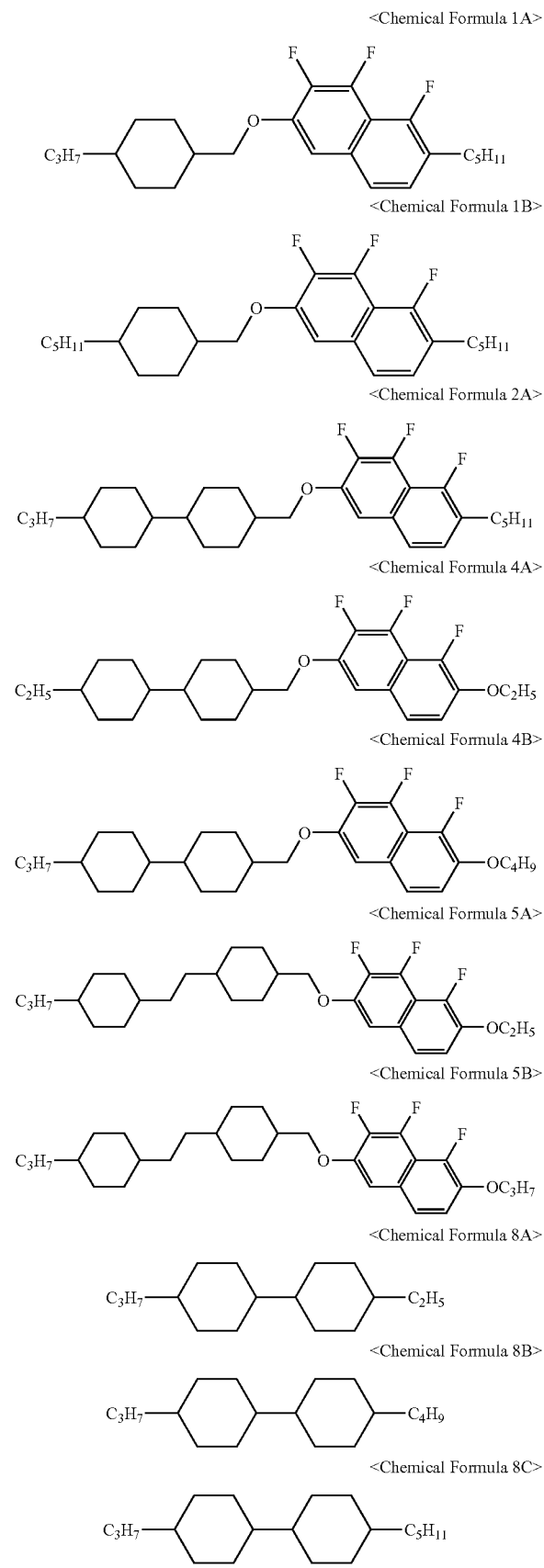

wherein R53, R54, R55, R56, R57, R58, R59, R60, R61, R62, R63, R64, and R66 independently represent an alkyl group, and R65 represents an alkenyl group.

The transition temperature of the liquid crystal composition was about 76° C. The Δn value of the liquid crystal composition was about 0.083. The Δ∈ value of the liquid crystal composition was about −4.1. A 17-inch LCD panel (for monitors) including the liquid crystal composition of Comparative Example 3 was prepared. As a result of performing substantially the same method as in Experiment 1, after-images were observed on the screen of the 17-inch LCD panel after the 17-inch LCD panel had been driven for about 100 hours.

Example 4

About 6% by weight of a compound represented by the following Chemical Formula 1A, about 6% by weight of a compound represented by Chemical Formula 1B, about 8% by weight of a compound represented by Chemical Formula 2A, about 4% by weight of a compound represented by Chemical Formula 4A, about 4% by weight of a compound represented by Chemical Formula 4B, about 4% by weight of a compound represented by Chemical Formula 5A, about 4% by weight of a compound represented by Chemical Formula 5B, about 15% by weight of a compound represented by Chemical Formula 8A, about 7% by weight of a compound represented by Chemical Formula 8B, about 7% by weight of a compound represented by Chemical Formula 8C, about 14% by weight of a compound represented by Chemical Formula 11A, about 14% by weight of a compound represented by Chemical Formula 11B, and about 7% by weight of a compound represented by Chemical Formula 12A were mixed to prepare a liquid crystal composition.

-continued

<Chemical Formula 11A>

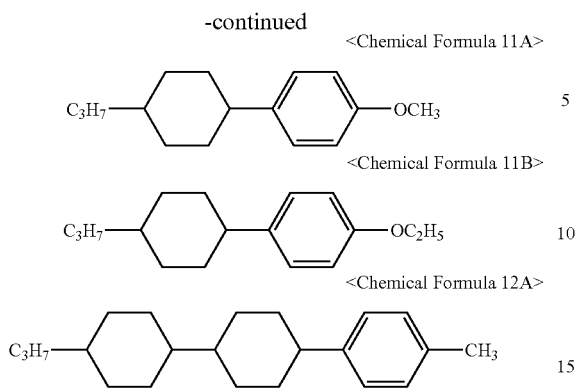

<Chemical Formula 11B>

<Chemical Formula 12A>

Example 5

About 12% by weight of a compound represented by Chemical Formula 1A, about 12% by weight of a compound represented by Chemical Formula 1B, about 5% by weight of a compound represented by Chemical Formula 4A, about 15% by weight of a compound represented by Chemical Formula 8A, about 7% by weight of a compound represented by Chemical Formula 8B, about 4% by weight of a compound represented by Chemical Formula 8C, about 14% by weight of a compound represented by Chemical Formula 11A, about 11% by weight of a compound represented by Chemical Formula 11B, and about 20% by weight of a compound represented by Chemical Formula 12A were mixed to prepare a liquid crystal composition.

<Chemical Formula 1A>
<Chemical Formula 1B>
<Chemical Formula 4A>
<Chemical Formula 8A>
<Chemical Formula 8B>

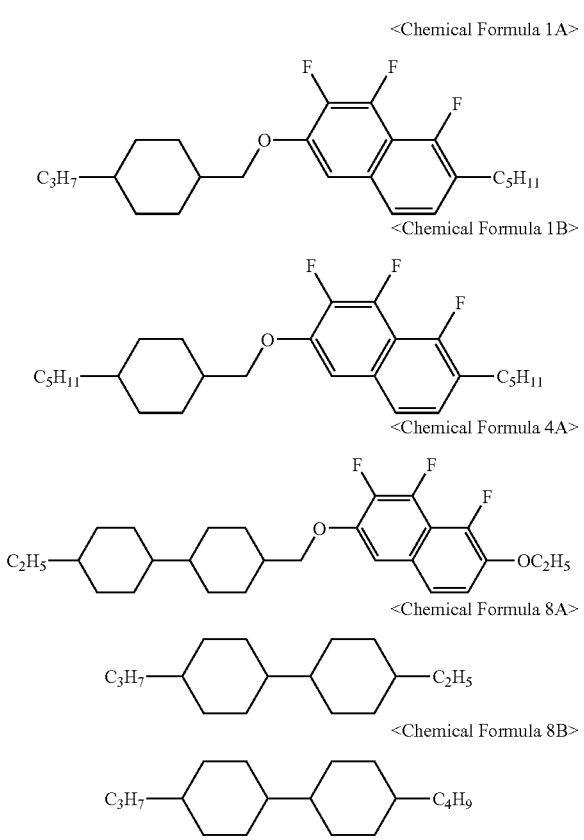

-continued

<Chemical Formula 8C>

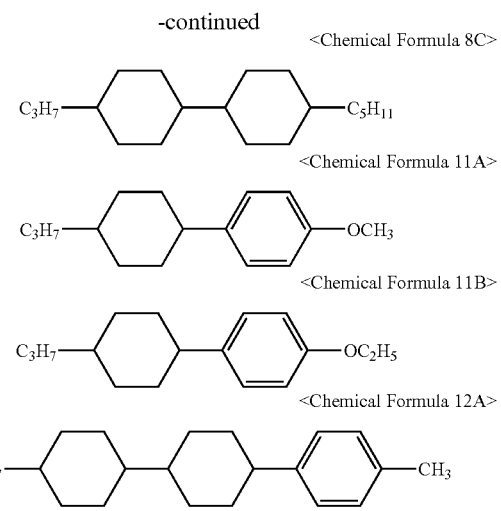

<Chemical Formula 11A>
<Chemical Formula 11B>
<Chemical Formula 12A>

A liquid crystal composition according to an exemplary embodiment of the present invention may have relatively high reliability when driven at a high temperature for a long time. Furthermore, the diffraction anisotropy of the liquid crystal composition may be relatively high. Thus, a cell gap of an LCD apparatus may be reduced, and the response speed of the LCD apparatus may be increased. For example, when an LCD apparatus including the liquid crystal composition is driven by a dynamic capacitance compensation (DCC) method, the response speed of the LCD apparatus may be less than about 10 ms.

Furthermore, the liquid crystal composition may have a desired dielectric anisotropy because it includes relatively small amounts of a negative dielectric compound. Thus, manufacturing costs may be reduced.

Liquid Crystal Composition

FIG. 1 is a cross-sectional view showing an LCD apparatus according to an exemplary embodiment of the present invention. Referring to FIG. 1, an LCD apparatus 100 includes a thin-film transistor (TFT) substrate 120, an opposing substrate 110, and a liquid crystal layer 130 interposed between the TFT substrate 120 and the opposing substrate 110. A plurality of pixel areas is defined on the TFT substrate 120.

The opposing substrate 110 may include a base substrate 111, a light-blocking layer 112, a color filter 113, an upper organic insulation layer 114, a common electrode 115, and an upper alignment film 101. The light-blocking layer 112 is formed on the base substrate 111. The light-blocking layer 112 may include an opaque material, for example, a coloring agent such as a carbon black.

The color filter 113 is formed on the base substrate 111 and may partially overlap with the light-blocking layer 112 and/or an adjacent color filter 113. The upper organic insulation layer 114 protects the light-blocking layer 112 and the color filter 113 and compensates for a height difference between the light-blocking layer 112 and the color filter 113 to planarize a surface of the opposing substrate 110.

Examples of a material that may be used for the common electrode 115 may include a transparent conductive material, for example, indium tin oxide (ITO) or indium zinc oxide (IZO). A predetermined voltage is applied to the common electrode 115. The upper alignment film 101 contacts the liquid crystal layer 130 to align liquid crystal molecules 131 of the liquid crystal layer 130 in a predetermined direction.

The TFT substrate 120 includes a plurality of TFTs. Particularly, the TFT substrate 120 may include a base substrate 121, a gate electrode 122, a gate insulation layer 123, a channel layer 124a, an ohmic contact layer 124b, a source electrode 125, a drain electrode 126, a passivation layer 127, a lower organic insulation layer 128, a pixel electrode 129, and a lower alignment film 102.

The gate electrode 122 is formed on the base substrate 121 and is provided with a gate signal through a gate line (not shown). The gate insulation layer 123 is formed on the base substrate 121 to cover the gate electrode 122.

The channel layer 124a is formed on the gate insulation layer 123 and overlaps with the gate electrode 122. The ohmic contact layer 124b is formed on the channel layer 124a and includes a pair of ohmic contact patterns spaced apart from each other.

The source electrode 125 and the drain electrode 126 are formed on the ohmic contact layer 124b. The source electrode 125 and the drain electrode 126 are spaced apart from each other to expose a portion of the channel layer 124a. A portion of the drain electrode 126 is connected to the pixel electrode 129 through a contact hole CH of the upper organic insulation layer 128.

The passivation layer 127 covers the source electrode 125, the drain electrode 126, and the exposed portion of the channel layer 124a. The lower organic insulation layer 128 having a flat surface is formed on the passivation layer 127. The lower organic insulation layer 128 compensates for the height differences of the TFT substrate 120. The contact hole CH is formed through the lower organic insulation layer 128 so that the drain electrode 126 is connected to the pixel electrode 129 through the contact hole CH.

The pixel electrode 129 is formed on the lower organic insulation layer 128. A data voltage is applied to the pixel electrode 129 through the drain electrode 126. A voltage difference between the data voltage of the pixel electrode 129 and the common voltage of the common electrode 115 forms an electric field so that the liquid crystal molecules 131 of the liquid crystal layer 130 are aligned.

The liquid crystal layer 130 includes a liquid crystal composition. The liquid crystal composition is substantially the same as the previously described liquid crystal composition according to an exemplary embodiment of the present invention, so a detailed description will be omitted.

The LCD apparatus may be in a vertical alignment (VA) mode. Furthermore, each pixel area of the LCD apparatus may be divided into a plurality of domains and the molecules of the liquid crystal composition may be aligned in at least two different directions in one pixel area so as to improve the viewing angle. The LCD apparatus may include a protrusion in each pixel area to divide the pixel area into a plurality of domains. Alternatively, a pixel electrode and/or a common electrode may have a cutout portion.

The LCD apparatus according to an exemplary embodiment of the present invention may have relatively high reliability when driven at a high temperature for a long time. Furthermore, the diffraction anisotropy of a liquid crystal composition in the LCD apparatus is relatively high. Thus, a cell gap Δd of the LCD apparatus may be reduced, and the response speed of the LCD apparatus may be increased. Particularly, the cell gap Δd of the LCD apparatus may be less than about 5 μm.

According to the above, the reliability and response speed of an LCD apparatus may be improved and manufacturing costs may be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal composition, consisting of:
    about 1 to about 40% by weight of an alkoxyl naphthalene-base compound comprising at least one compound represented by Chemical Formula 1 or at least one compound represented by Chemical Formula 2;
    about 5 to about 30% by weight of a dialkoxyl naphthalene-base compound comprising at least one compound represented by Chemical Formula 3, at least one compound represented by Chemical Formula 4, or at least one compound represented by Chemical Formula 5; and
    about 5 to about 80% by weight of a low viscosity compound comprising at least one compound represented by Chemical Formula 8, at least one compound represented by Chemical Formula 9, at least one compound represented by Chemical Formula 10, at least one compound represented by Chemical Formula 11, at least one compound represented by Chemical Formula 12, or at least one compound represented by Chemical Formula 13,

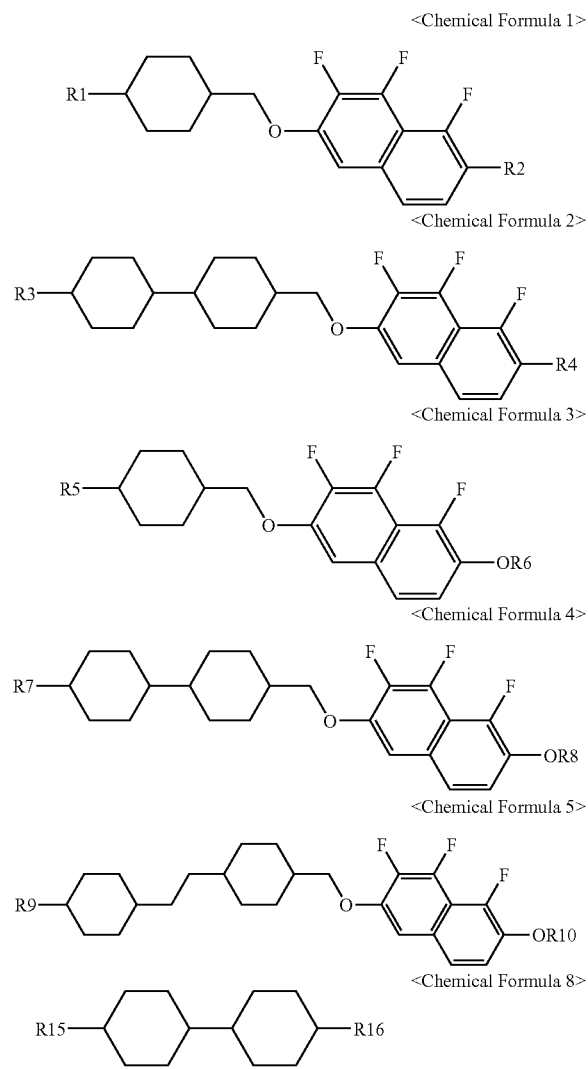

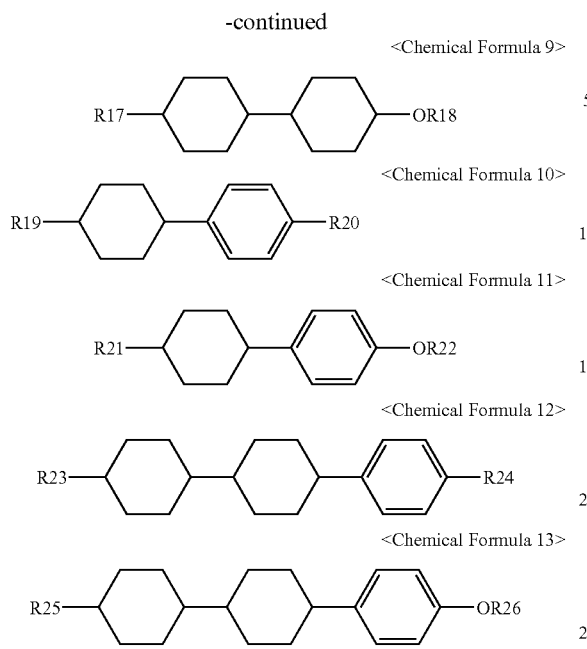

wherein R1, R2, R3, R4, R5, R6, R7, R8, R9, R10, R15, R16, R17, R18, R19, R20, R21, R22, R23, R24, R25, and R26 independently represent an alkyl group having 1 to 10 carbon atoms.

2. A liquid crystal composition, consisting of:

about 1 to about 40% by weight of an alkoxyl naphthalene-base compound comprising at least one compound represented by Chemical Formula 1 or at least one compound represented by Chemical Formula 2;

about 5 to about 30% by weight of a dialkoxyl naphthalene-base compound comprising at least one compound represented by Chemical Formula 3, at least one compound represented by Chemical Formula 4, or at least one compound represented by Chemical Formula 5;

about 40% by weight or less of a chromene-based compound comprising at least one compound represented by Chemical Formula 6 or at least one compound represented by Chemical Formula 7; and about 5 to about 80% by weight of a low viscosity compound comprising at least one compound represented by Chemical Formula 8, at least one compound represented by Chemical Formula 9, at least one compound represented by Chemical Formula 10, at least one compound represented by Chemical Formula 11, at least one compound represented by Chemical Formula 12, or at least one compound represented by Chemical Formula 13,

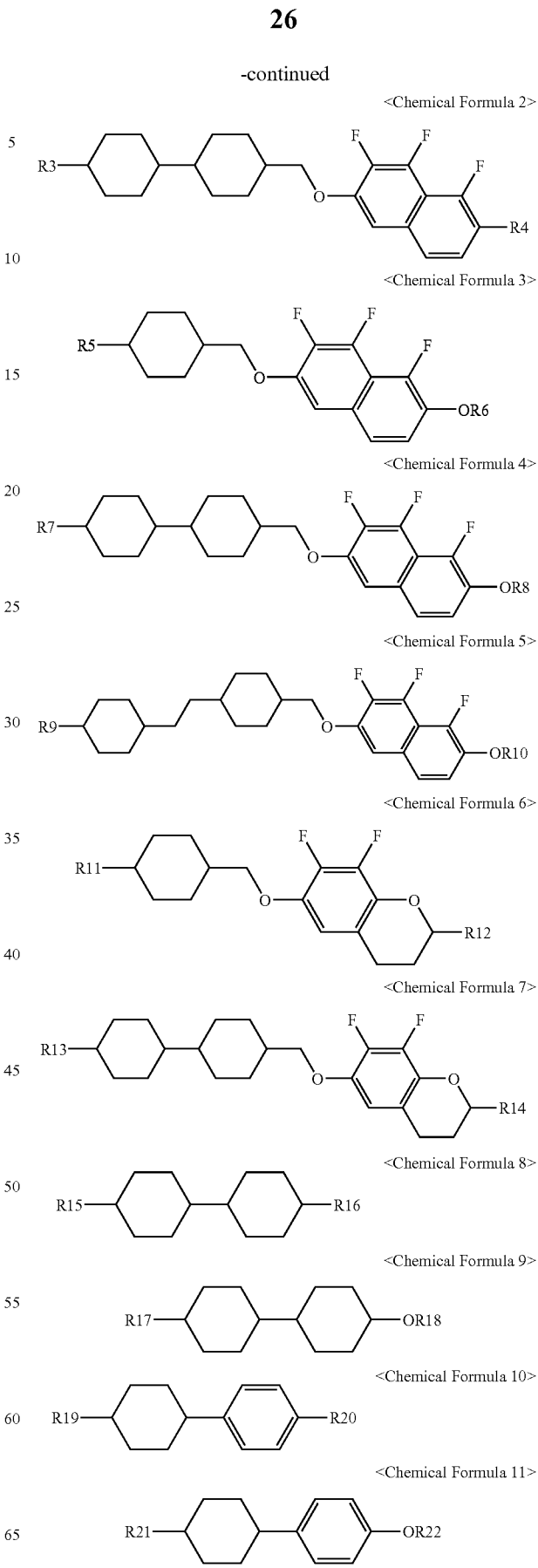

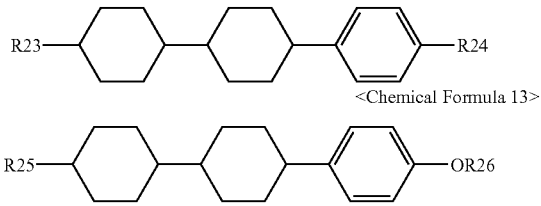

wherein R1, R2, R3, R4, R5, R6, R7, R8, R9, R10, R15, R16, R17, R18, R19, R20, R21, R22, R23, R24, R25, and R26 independently represent an alkyl group having 1 to 10 carbon atoms, and wherein R11, R12, R13, and R14 independently represent an alkyl group having 1 to 10 carbon atoms.

3. A liquid crystal display (LCD) apparatus comprising:

a thin-film transistor (TFT) substrate comprising a plurality of TFTs;

an opposing substrate facing the TFT substrate; and a liquid crystal layer interposed between the TFT substrate and the opposing substrate, the liquid crystal layer consisting of:

about 1 to about 40% by weight of an alkoxyl naphthalene-base compound comprising at least one compound represented by Chemical Formula 1 or at least one compound represented by Chemical Formula 2;

about 5 to about 30% by weight of a dialkoxyl naphthalene-base compound comprising at least one compound represented by Chemical Formula 3, at least one compound represented by Chemical Formula 4, or at least one compound represented by Chemical Formula 5; and about 5 to about 80% by weight of a low viscosity compound comprising at least one compound represented by Chemical Formula 8, at least one compound represented by Chemical Formula 9, at least one compound represented by Chemical Formula 10, at least one compound represented by the following Chemical Formula 11, at least one compound represented by Chemical Formula 12, or at least one compound represented by Chemical Formula 13,

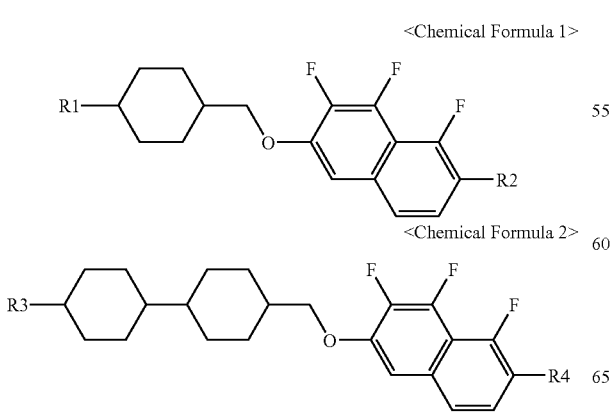

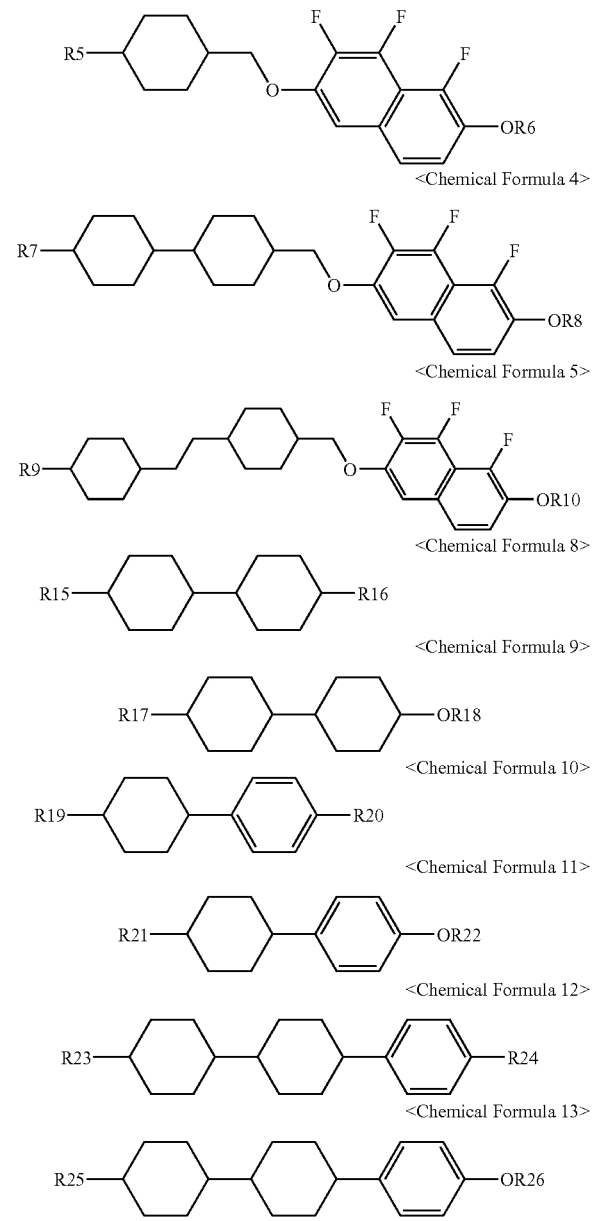

wherein R1, R2, R3, R4, R5, R6, R7, R8, R9, R10, R15, R16, R17, R18, R19, R20, R21, R22, R23, R24, R25, and R26 independently represent an alkyl group having 1 to 10 carbon atoms.

4. A liquid crystal display (LCD) apparatus comprising:

a thin-film transistor (TFT) substrate comprising a plurality of TFTs;

an opposing substrate facing the TFT substrate; and a liquid crystal layer interposed between the TFT substrate and the opposing substrate, the liquid crystal layer consisting of:

about 1 to about 40% by weight of an alkoxyl naphthalene-base compound comprising at least one compound represented by Chemical Formula 1 or at least one compound represented by Chemical Formula 2;

about 5 to about 30% by weight of a dialkoxyl naphthalene-base compound comprising at least one compound represented by Chemical Formula 3, at least one compound represented by Chemical Formula 4, or at least one compound represented by Chemical Formula 5;

about 40% by weight or less of a chromene-based compound including at least one compound represented by Chemical Formula 6 or at least one compound represented by Chemical Formula 7; and about 5 to about 80% by weight of a low viscosity compound comprising at least one compound represented by Chemical Formula 8, at least one compound represented by Chemical Formula 9, at least one compound represented by Chemical Formula 10, at least one compound represented by the following Chemical Formula 11, at least one compound represented by Chemical Formula 12, or at least one compound represented by Chemical Formula 13, <Chemical Formula 1>

<Chemical Formula 2>

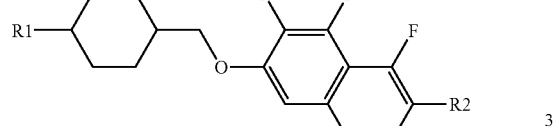

<Chemical Formula 3>

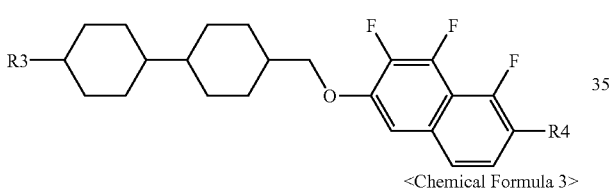

<Chemical Formula 4>

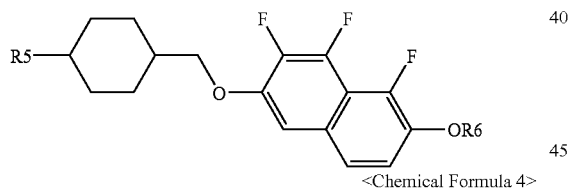

<Chemical Formula 5>

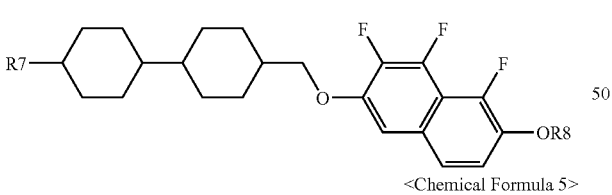

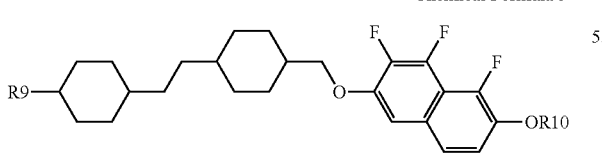

-continued

<Chemical Formula 6>

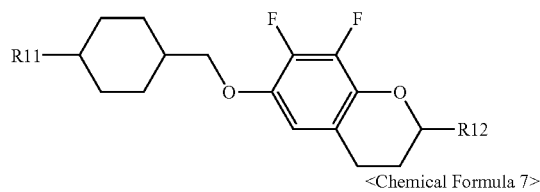

<Chemical Formula 7>

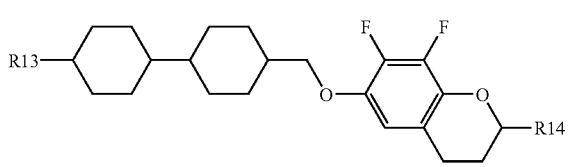

<Chemical Formula 8>

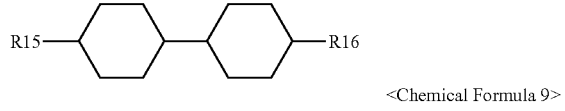

<Chemical Formula 9>

<Chemical Formula 10>

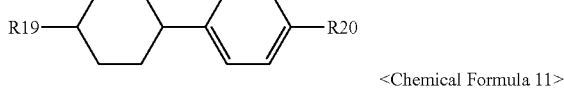

<Chemical Formula 11>

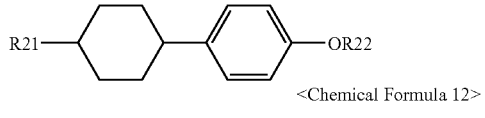

<Chemical Formula 12>

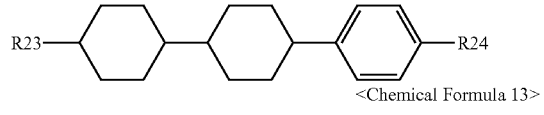

<Chemical Formula 13>

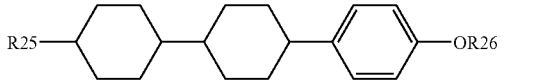

wherein R1, R2, R3, R4, R5, R6, R7, R8, R9, R10, R15, R16, R17, R18, R19, R20, R21, R22, R23, R24, R25, and R26 independently represent an alkyl group having 1 to 10 carbon atoms, and wherein R11, R12, R13, and R14 independently represent an alkyl group having 1 to 10 carbon atoms.

5. The LCD apparatus of claim 3, wherein a cell gap between the TFT substrate and the opposing substrate is no more than 5 μm, and the liquid crystal layer is in vertical alignment (VA) mode.

6. The LCD apparatus of claim 3, wherein the Δn value of the liquid crystal composition is about 0.08 to about 0.25, a plurality of pixel areas is defined on the TFT substrate, and the liquid crystal composition is aligned in at least two different directions in one pixel area.

* * * * *